(12) United States Patent
Patoureaux et al.

(10) Patent No.: US 8,812,333 B2
(45) Date of Patent: Aug. 19, 2014

(54) AUTOMATED SPLIT TICKETING

(75) Inventors: Marc Patoureaux, Grasse (FR); Cédric Dourthe, Nice (FR); Thierry Dufresne, Opio (FR)

(73) Assignee: Amadeus S.A.S., Sophia Antipolis (FR)

( * ) Notice: Subject to any disclaimer, the term of this patent is extended or adjusted under 35 U.S.C. 154(b) by 782 days.

(21) Appl. No.: 11/856,091

(22) Filed: Sep. 17, 2007

(65) Prior Publication Data

US 2009/0076862 A1 Mar. 19, 2009

(51) Int. Cl.
*G06Q 10/00* (2012.01)
*G06Q 50/14* (2012.01)
*G06Q 30/06* (2012.01)
*G06Q 10/04* (2012.01)
*G06Q 10/02* (2012.01)
*G06F 17/30* (2006.01)

(52) U.S. Cl.
CPC ............... *G06Q 30/06* (2013.01); *G06Q 50/14* (2013.01); *G06Q 10/04* (2013.01); *G06Q 10/02* (2013.01); *G06F 17/30961* (2013.01)
USPC .......................................................... 705/5

(58) Field of Classification Search
USPC .......................................................... 705/5
See application file for complete search history.

(56) References Cited

U.S. PATENT DOCUMENTS

| | | | |
|---|---|---|---|
| 5,649,103 A | 7/1997 | Datta et al. | |
| 6,275,808 B1 * | 8/2001 | DeMarcken | 705/6 |
| 6,295,521 B1 * | 9/2001 | DeMarcken et al. | 705/6 |
| 6,377,932 B1 * | 4/2002 | DeMarcken | 705/5 |
| 6,381,578 B1 * | 4/2002 | DeMarcken | 705/6 |
| 6,553,346 B1 | 4/2003 | Walker et al. | |
| 7,069,235 B1 | 6/2006 | Postelnik et al. | |
| 7,562,027 B1 * | 7/2009 | Baggett et al. | 705/5 |
| 2002/0065688 A1 * | 5/2002 | Charlton et al. | 705/5 |
| 2002/0184059 A1 * | 12/2002 | Offutt et al. | 705/5 |
| 2003/0036928 A1 * | 2/2003 | Kenigsberg et al. | 705/5 |
| 2003/0144852 A1 | 7/2003 | Eckert et al. | |
| 2006/0069592 A1 | 3/2006 | Di Florio et al. | |
| 2006/0218054 A1 | 9/2006 | Postelnik et al. | |

FOREIGN PATENT DOCUMENTS

| | | |
|---|---|---|
| JP | 2004-341566 | 12/2004 |
| WO | WO 01/67348 | 9/2001 |
| WO | WO 2005/022424 | 3/2005 |

* cited by examiner

*Primary Examiner* — Tonya Joseph
(74) *Attorney, Agent, or Firm* — Wood, Herron & Evans LLP

(57) ABSTRACT

An enhanced travel search tool aimed at providing travel opportunities includes a ticket splitter operating from a list of flight connections provided by a front-end flight search engine. The ticket splitter comprises a unit for valuating all ticket partitions generated from the provided list of connection flights and a tree of split criteria updated in a cache for determining the partitions and attributing to each partition a probability value of obtaining a split-ticket solution. The ticket splitter also includes a unit for selecting those of the valuated partitions that have a probability value higher than a defined threshold and provides a sorted list of recommended partitions to a back-end fare search engine to price all the selected partitions including a reference single-ticket solution. Travel search tool offering of travel opportunities is enhanced by automatically including multi-ticket travel solutions.

12 Claims, 4 Drawing Sheets

AUTOMATED SPLIT TICKETING

FIELD OF THE INVENTION

The present invention relates generally to the field of travel search tools, and more specifically, describes a system that significantly enhances their capabilities by including automated multi-ticketing solutions when searching for low-fare travel opportunities.

BACKGROUND OF THE INVENTION

Traditional travel agencies and other travel service providers are using computerized travel search tools to handle the travel requests of their customers. To be able to offer this service they are generally affiliated with a GDS or global distribution system such as AMADEUS a world-wide provider of technology solutions to the travel industry. GDS's have large or very large proprietary computer systems allowing real-time access from all over the world to airline fares, schedules and seating availabilities. They are thus offering the capability of booking reservations through all sorts of travel service providers including numerous online travel agencies (OLTA) that now offer their services directly to travelers over the Internet under the form of websites. An example of such an online travel company is Opodo at http//www.opodo.com.

Whichever service is provided traditionally by a travel agent, on behalf of its customers, or directly by end-users connecting to a travel site on the Internet, both are using in the background the travel search tools provided by the GDS supporting them. Using travel search tools and the software travel applications of the travel service providers typically requires entering an origin and a destination city, the corresponding travel dates, the number of travelers and a few other preferences. Then, exploring its databases of schedules, availabilities and fares of flights, GDS travel search tools can return what are the currently available travel opportunities that satisfy the request.

Although significant differences may exist from one travel service provider to the other (in the way their tools and travel software applications are designed and implemented, and depending on what GDS they are affiliated with) they have however all in common the chief objective of providing the cheapest possible travel solutions to their customers. Travel cost is indeed the prime discriminating factor, if not the only one, for the large majority of all business and leisure travelers.

This objective is however fulfilled by current travel search tools on the basis of a single-ticket solution, often a round-trip ticket, between an origin city A and a destination city B. One or more flight connections, e.g.: through intermediate cities C and/or D, are however often possible or required if no direct flight exists between A and B. This is indeed often the case for overseas flights or when traveling within large geographical areas like the European community or in Northern America. Experienced travelers know that in this case, i.e., when one or more flight connections are possible or required, it may become advantageous to buy two or more tickets and get, overall, a cheaper travel solution. Hence, they split their trip. With the above example a traveler may decide, for example, to book two separate round-trip tickets, one between A and C and the other one between C and B (or between A and D, and D and B). Because of the sophistication of the pricing policies in the travel industry, especially with airlines, the two round-trip flights may take advantage of the airline's pricing schemes to create a lower overall airfare. Split ticketing can involve a single carrier and multiple carriers as well.

Manual split ticketing is however essentially a matter of experience, skill and time. It takes time since each option must be tried separately from the travel search tool and carefully checked to make sure that schedules and other constraints are consistent (Is there enough time left to catch the independently booked connecting flight? Are the flights arriving and departing from the same city airport? And so on.). Exhaustively trying all combinations of carriers, intermediate cities and airports and the number of tickets to issue, i.e., the number of partitions, is not only a time-consuming job it also multiplies accordingly the number of requests thus the computing time required from the computing resources of the travel service providers and GDSs. If generalized, manual split ticketing would adversely affect their computing resources.

Indeed, the number of partitions to try is growing at an exponential rate when the number of possible flights is increasing. The number of combinations to consider is theoretically growing as what is known in mathematics as the Bell numbers which give the number of ways a set of n elements can be partitioned into nonempty subsets. For example, for a number of flights ranging from 1 to 8, the theoretical number of partitions are respectively 1, 2, 5, 15, 52, 203, 877 and 4140. Even though not all partitions need in practice to be considered (disjoint partitions can be eliminated) the number of cases that are actually to be retained is far beyond what a manual process can sustain. Neither a skilled travel agent nor an individual have in practice enough time and dedication to try them exhaustively.

The problem of the large number of partitions to consider in the general case has thus prevented travel service providers from offering a complete solution other than a very limited and straightforward application of split-ticketing. It consists in considering, on top of the single-ticket solution, the only case of a multi-ticket solution made of two one-way tickets between the origin and destination cities.

It is therefore the main object of the invention to describe an automated system that can potentially handle all cases of split-ticketing in order to broaden the ability of travel search tools to deliver low-fare travel solutions.

It is another object of the invention to allow considering all ticket partitions without significantly increasing the computing resources and elapsed time necessary to achieve it.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes an enhanced travel search tool aimed at providing travel opportunities. The travel search tool includes a ticket splitter operating from a list of flight connections provided by a front-end flight search engine. The ticket splitter comprises a means for valuating all ticket partitions generated from the provided list of connection flights and a tree of split criteria updated in a cache for determining the partitions and attributing to each partition a probability value of obtaining a split-ticket solution. The ticket splitter also includes a means for selecting those of the valuated partitions that have a probability value higher than a defined threshold and provides a sorted list of recommended partitions to a back-end fare search engine to price all the selected partitions including a reference single-ticket solution.

The tree of split criteria is kept updated on the basis of the travel transactions processed by a global distribution system (GDS) and kept maintained below a critical size by removing obsolete tree nodes. The tree of split criteria is a hierarchical layered tree of nodes each holding a split criterion with an associated probability value of obtaining a split-ticket solution.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
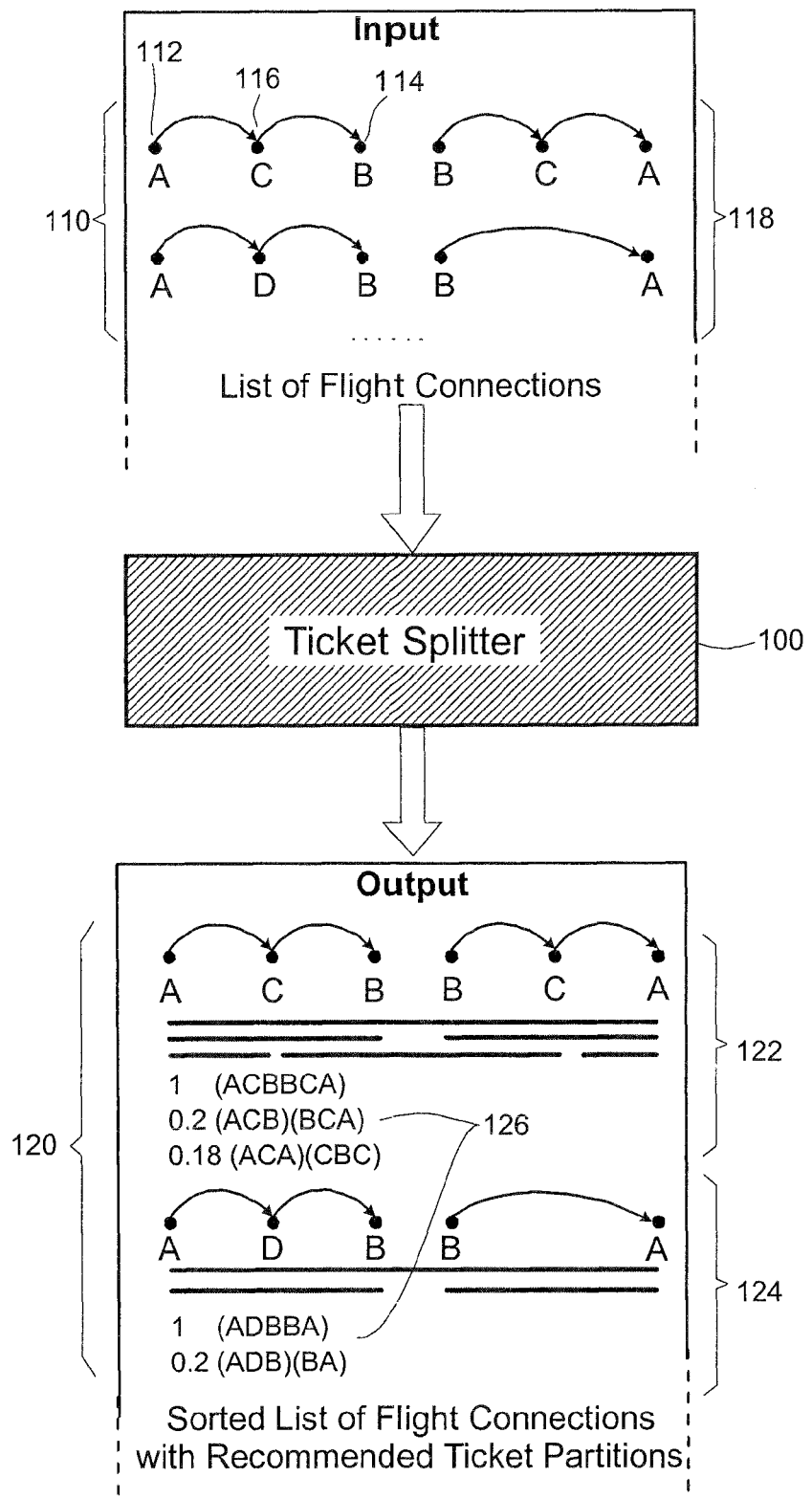
FIG. 1 describes what a ticket splitter according to the invention needs as input and what it delivers to allow an automatic splitting of air tickets.

FIG. 1 first describes what a ticket splitter (100) according to the invention needs as input and what it delivers to allow an automatic splitting of air tickets.

Input to the ticket splitter, further described in the following figures, is the list of all possible flight connections (110) to reach a destination city B (114) from an origin city A (112) possibly including returning from B to A through the same connection(s) or not (118). When requesting to fly from A to B a traveler is generally provided with a list of opportunities often including one or more connections (116). Connections are determined by any standard travel search tool like the ones made available to travel agencies and provider of travel services by a few GDS's already mentioned in the background section. GDS's, that implement very large computing resources, manage their own databases of flight schedules and availabilities and have also access to all airline databases so that, with the proper travel search software applications, travel routes can be established that best fulfil traveler requests.

Then, on the basis of the provided list of flight connections the ticket splitter (100) is devised to deliver a comprehensive sorted list of ticket partitions (120) susceptible to provide cheap single and multiple ticket solutions. The recommended ticket partitions are established by ticket splitter which, as further explained in the following description, continuously observing GDS travel transaction traffic, gathers up-to-date information on how to best split a ticket. In the example of FIG. 1 three partitions are thus recommended (122) when flight connection considered is C (116). The three recommended partitions of this example include a single round-trip ticket (ACBBCA), i.e., actually, no partition; a single partition made of two one-way tickets (ACB) and (BCA); and a single partition made of two round-trip tickets (ACA) and (CBC).

When flight connection is D on the forward portion of the trip two recommended partitions are also proposed (124). Like above, a single round-trip ticket (ADBBA) and two one-way tickets (ADB) and (BA) are proposed. Recommended partitions are sorted according to a computed probability of success (126) further discussed.

Figure 2:
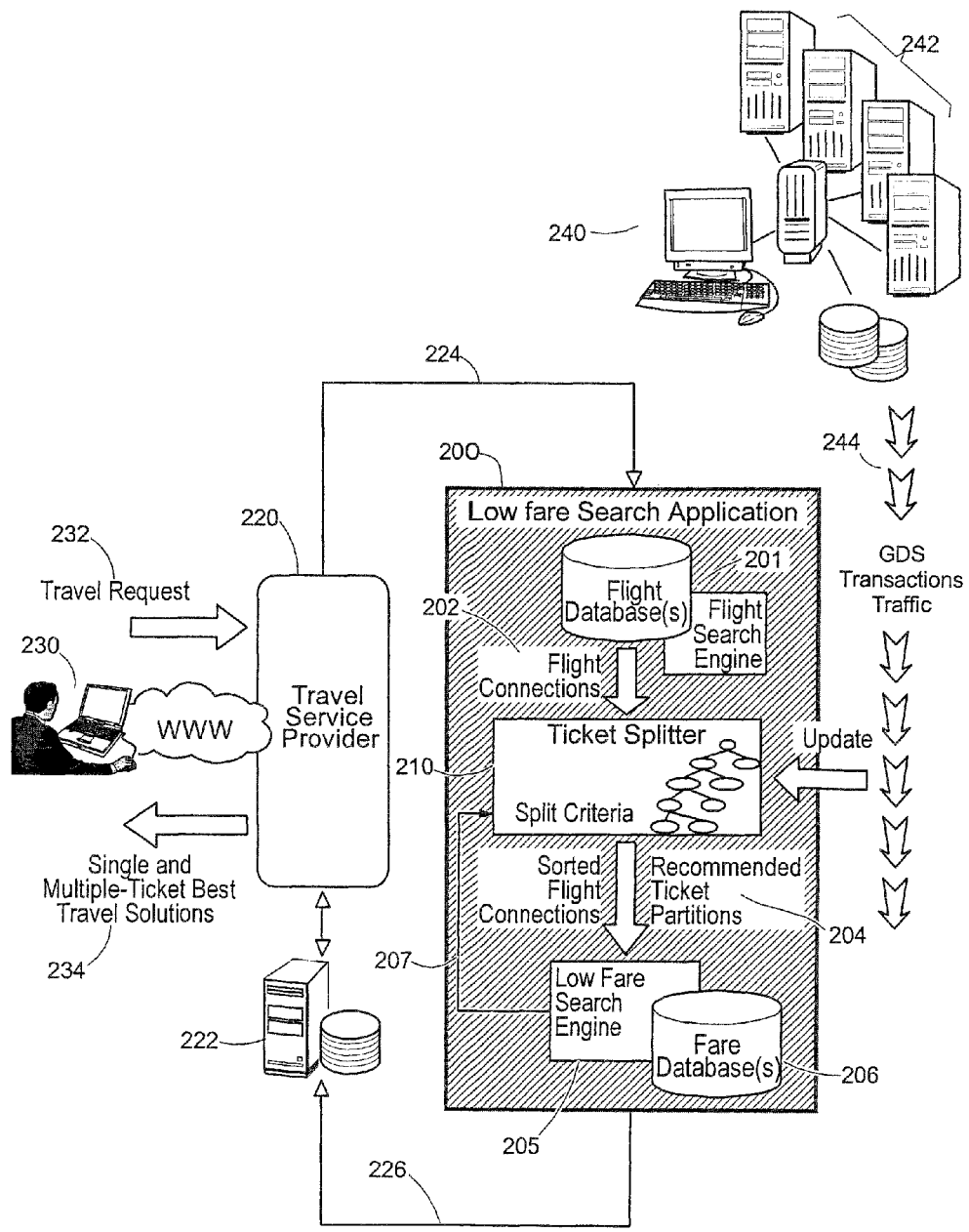
FIG. 2 describes the overall environment in which the invention is preferably operated.

FIG. 2 describes the overall environment in which the invention is preferably operated.

A system according to the invention imbeds a ticket splitter (210) aimed at automatically providing multi-ticket solutions in the framework of a travel software application, typically a low-fare search application (200) of the kind mentioned in FIG. 1 and in the background section. Low-fare search application is thus accessible from the computing resources (222) of the travel service providers (220) client of the GDS (240). End-users (230) are typically either travel agents handling travel requests (232) on behalf of their customers or travelers booking directly their trips from an online travel service provider. End-users, travel service providers and GDS are all interconnected in any combination of private and public networks including the Internet and communicate through all sorts of standard protocols including the TCP/IP series of protocols supporting the Internet and many other private networks as well. Travel service provider (220) is typically a world-wide-web or web server. Web, the most spread application of the Internet, is a client-server protocol in which interactive web pages are put together and forwarded by the server to the computing resources of the client, e.g., to the personal computer of the end-user (230) running an Internet browser or navigator in order to display them and to allow booking of a trip. Alternatively, travel service provider is operating from a legacy computing system, e.g., comprised of mainframes, used to serve all the travel agents of a large travel organization and possibly equipped with dedicated terminals running non-Internet protocols.

The front-end part (201) of the travel software application imbedding a ticket splitter, e.g., the low fare search application (200) is therefore assumed to prepare, as already discussed in FIG. 1, the list of flight connections (202) used as input to the ticket splitter (210). The flight connections, corresponding to each specific end-user request and forwarded from the travel service provider (224), are determined through traditional methods and techniques carried out by state-of-the-art flight search tools on the basis of flight database contents (201). Flight databases (schedules and availabilities of flights) are housed or made accessible from the GDS (240). GDS operates large reliable computing and storing resources (242) in a 24-hour-a-day/7-day-a-week mode and are made world-wide accessible by all the travel service providers, clients of the GDS.

On the basis of the flight connections (202) thus provided for the current end-user request (224), ticket splitter is able to deliver a list of recommended ticket partitions (204), including no-partition (single ticket solution), to the low fare search engine (205), i.e., the back-end part of the low fare search application. The low fare search engine operates in a conventional way from one or more databases of fares (206) available, like the flight databases, from the GDS (240). Hence, it can determine the cost of all the travel solutions, including single-ticket and multi-ticket solutions, as recommended by the ticket splitter (210). The whole is returned (226) to the intermediate travel service provider (220) which can forward in turn the recommended priced travel solutions (234) to the end-user who has initiated the request in an appropriate format. This takes generally the form of a web page that is displayed on end-user computer screen. Alternatively, display of the found travel solutions is done on the monitor of a travel agent handling traveler requests.

The split criteria used by ticket splitter are derived from the observation of the traffic (244) of travel transactions processed by the GDS. Criteria are regularly updated so that the recommended partitions are kept consistent with the actual airline traffic conditions and actual carrier seat availabilities. Also, as further discussed, the best travel solutions priced by the fare search engine (205) are retrofitted to the ticket splitter (207) and contribute to update the split criteria.

Figure 3:
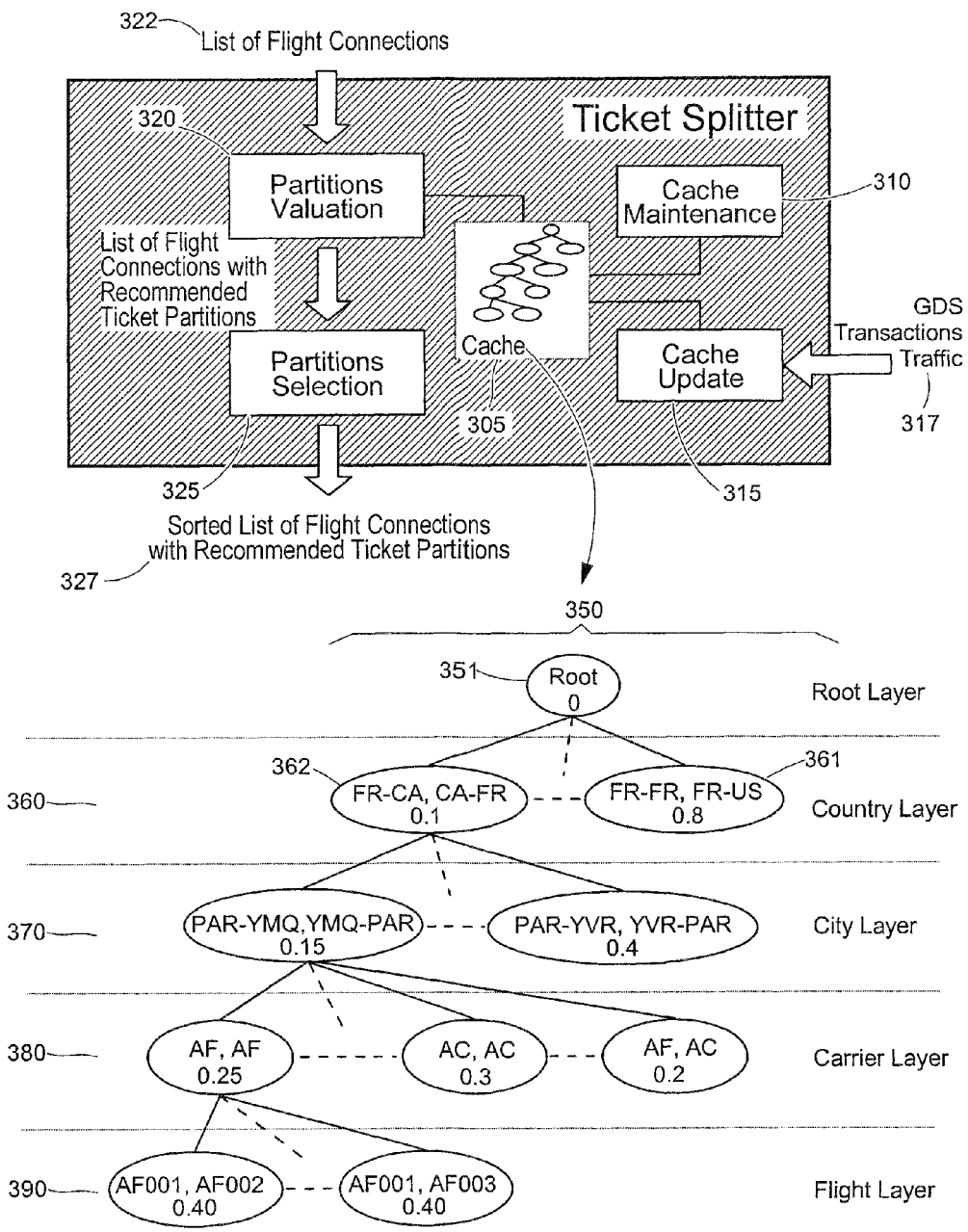
FIG. 3 shows how ticket splitter is organized.

FIG. 3 shows how ticket splitter is organized.

The main component of the ticket splitter is a cache of split criteria (305). At any point of time the cache contains only a selected subset of the huge potential amount of available data that could be used otherwise to split tickets. The cache is constantly kept updated by the corresponding function (315) on the basis of all the travel transactions handled by GDS and of the information retrofitted from the back-end fare search engine as shown in FIG. 2. Also, the cache is maintained (310), e.g., to remove all pieces of information time-to-live (TTL) of which has expired, or because cache storing size has grown above an upper specified limit and must be cleaned. The cache is structured as a layered tree (350), further described hereafter through an example, in order to optimize memory usage and to allow the partition valuation function (320) expediting searches among the currently stored split criteria.

All tree nodes below the root node (351) hold the criteria retained to split tickets. A computed probability value of successfully getting a cheaper split-solution (in a range 0-1 versus the non-split solution) is attached to each node and split criterion. Root node is the entry node for all searches in the tree. It has no associated criterion and attached probability is null. Hence, in this example of a layered tree of split criteria, the first layer discriminator is the country (360). Node split criterion in this layer thus involves a country pair, e.g.: France and Canada (FR, CA) and France and United States (FR, US). This latter node (361) is a leaf node from which no further search can be performed so that, if reached, split criterion cannot be further refined (and/or need not to be further refined because the attached computed probability is already high, e.g.: 0.8, as shown in this example). On the contrary, the other node of the country layer (362) allows refining the split criterion down to the city layer (370) and possibly down to the carrier (380) and flight levels (390). The nodes contain, respectively, couples of countries, cities, carriers and flights from where splitting can be done each with an associated probability value. In the general case, there is anything from zero to N nodes per layer while the cache is updated (315) from the GDS transactions (317). When initialized, the cache contains only the root node (351).

It is worth noticing here that the criterion pair and probability value held by a parent node are kept consistent with the ones of the corresponding child node(s). Especially, refining split criteria by searching down a tree of split criteria must also lead to increase the probability value of the split criterion. Hence, the probability value of a child node is always larger or equal to the one of its parent node as this can be seen in the example of FIG. 3. Moreover, children nodes always inherit of the other characteristics of their parent nodes. It is one of the tasks assigned to the cache maintenance function (310) to keep node contents consistent. Especially, when a node is updated if computed probability becomes equal or higher than the ones of its children nodes those latter are removed.

Tree leaves are typically present in all layers of the tree, as in the example of FIG. 3, so that searches need not generally to be conducted down to the lower layer, i.e., the flight level, while reaching a level of probability higher than a given probability threshold referred to as Pmin in the following.

Probability value attached to each node is actually the ratio between two numbers. Denominator of the ratio is the number of times node split criterion is actually used by ticket splitter to deliver a ticket partition in output. The numerator is incremented each time the fare engine (205) shown in FIG. 2 determines that the corresponding partition indeed allows to deliver the cheapest multi-ticket travel solution. The information is retrofitted by the fare engine to the ticket splitter so that successful nodes are frequently updated with increasing probability values. If the corresponding node does not exist, it is created. Its initial values are inherited from its parent node. On the contrary, unsuccessful nodes see their probability values decreasing (since their denominators are growing faster) and will be eventually removed by the maintenance function (310). Maintenance function also keeps track of the memory size used by the ticket splitter. When a critical size is reached leaves whose probability values are too close to the ones of their parent nodes are removed first because they do not significantly contribute to increase the searched probability values.

Following is a detailed example of how the exemplary tree of FIG. 3 is used. This example considers a traveler request for a round-trip from NICE, France to MONTREAL, Canada. The two cities are here below referred to by their IATA (International Air Transport Association) city codes, respectively, NCE and YMQ. A connection through PARIS (IATA city code: PAR) is the first item on the provided list of flight connections (322) used as input to the partition valuation function (320) so that the corresponding complete round-trip route is:

NCE-AF001-PAR-AC001-YMQ+YMQ-AC002-PAR-AF002-NCE where AFxxx and ACxxx are flights operated, respectively, by Air-France and Air-Canada. Then, the three flight couples that can be valuated are:

Couple (AF001, AC001) is valuated at 0 because tree search stops at country layer (360) where there is no matching node. The expected node in this case would be (FR-FR, FR-CA) that does not exist, hence the null probability. Because value is less than Pmin (a positive value greater than 0 and less than 1) it is discarded.

Couple (AC001, AC002) is valuated at 0.3 because the expected country layer (FR-CA, CA-FR) is indeed found (362) with an attached probability value of 0.1. Depth searching of the tree can however successfully proceed; first at the city layer (370) where expected node (PAR-YMQ, YMQ-PAR) is found with an attached probability value of 0.15; then at carrier layer (380) where expected node (AC, AC) is also found with an attached probability value of 0.3. It is this latter value that is eventually retained for the corresponding flight couple, i.e.: (AC001, AC002).

Couple (AC002, AF002) is valuated at 0 too since expected country layer node, i.e.: (CA-FR, FR-FR) is not referenced either. As above, this case is discarded since value is below Pmin.

Hence, as a result of the three above searches, two recommended partitions are valuated for this first flight connection:

the reference no-partition case (NCE-PAR-YMQ-YMQ-PAR-NCE) whose value is set to 1.

the split partition corresponding to flight couple (AC001, AC002) resulting in two one-way tickets: (NCE-PAR-YMQ) and (YMQ-PAR-NCE), value of which is set to 0.3 as explained above.

The second exemplary item on the provided list of flight connections (322) includes connections through PARIS and NEW YORK city (IATA city code: NYC) as follows:

NCE-AF001-PAR-AC091-NYC-AC101-YMQ+YMQ-AC102-NYC-AC092-PAR-AF002-NCE

Then, five flight couples can be valuated:

Couple (AF001, AC091) is valuated at 0.8 because tree search stops at leaf node (FR-FR, FR-US) of country layer (360).

Couple (AC091, AC101) is valuated at 0 since expected country layer node (FR-US, US-CA) cannot be found.

Couple (AC101, AC102) is valuated at 0 for the same reason: country layer node (US-CA, CA-US) cannot be found.

Couple (AC102, AC092) is also valuated at 0 because expected country layer node (CA-US, US-FR) cannot be found either.

Couple (AC092, AF002) is valuated at 0.8 because tree search stops at leaf node (US-FR, FR-FR) of country layer. It's worth noticing here that tree nodes are not oriented, i.e., node (US-FR, FR-FR) is indeed the same as node (FR-FR, FR-US) shown in FIG. 3 (361).

The three flight couples valuated at 0 are discarded since they are less than Pmin. Two valid split points are left corresponding to flight couples (AF001, AC091) and (AC092, AF002) both with a connection in PARIS. This gives the following five recommended partitions and values:

The reference no-partition case (NCE-PAR-NYC-YMQ-YMQ-NYC-PAR-NCE) whose value is set to 1; and following single and 2-split partitions:
(NCE-PAR)(PAR-NYC-YMQ-YMQ-NYC-PAR-NCE) value=0.8
(NCE-PAR-NYC-YMQ-YMQ-NYC-PAR)(PAR-NCE) value=0.8
(NCE-PAR)(PAR-NYC-YMQ-YMQ-NYC-PAR)(PAR-NCE) value=0.64 (0.8×0.8)
(NCE-PAR-NCE)(PAR-NYC-YMQ-YMQ-NYC-PAR) value=0.64 (0.8×0.8)

In the general case, value of a n-split partition is the product of the individual split values.

Valuation of the partitions as in the above example is thus achieved by the corresponding function (320) on the basis of the split criteria currently contained in the cache from the provided list of flight connections (322). The recommended ticket partitions are further filtered by the partition selection function (325) which removes partitions having a probably of success too low before their submission to the fare engine. Hence, a sorted list of flight connections with recommended partitions (327) can be delivered, e.g., to the low-fare search engine (205) shown in FIG. 2.

In the case of the above detailed example the sorted list of recommended partitions is thus as follows:

| Index | Value | Item number (of the provided list of flight connections) | Recommended partition |
|---|---|---|---|
| 1 | (1) | (1) | (NCE-PAR-YMQ-YMQ-PAR-NCE) |
| 2 | (1) | (2) | (NCE-PAR-NYC-YMQ-YMQ-NYC-PAR-NCE) |
| 3 | (0.8) | (2) | (NCE-PAR)(PAR-NYC-YMQ-YMQ-NYC-PAR-NCE) |
| 4 | (0.8) | (2) | (NCE-PAR)(PAR-NYC-YMQ-YMQ-NYC-PAR-NCE) |
| 5 | (0.64) | (2) | (NCE-PAR)(PAR-NYC-YMQ-YMQ-NYC-PAR)(PAR-NCE) |
| 6 | (0.64) | (2) | (NCE-PAR-NCE)(PAR-NYC-YMQ-NYC-PAR) |
| 7 | (0.3) | (1) | (NCE-PAR-YMQ)(YMQ-PAR-NCE) |

Figure 4:
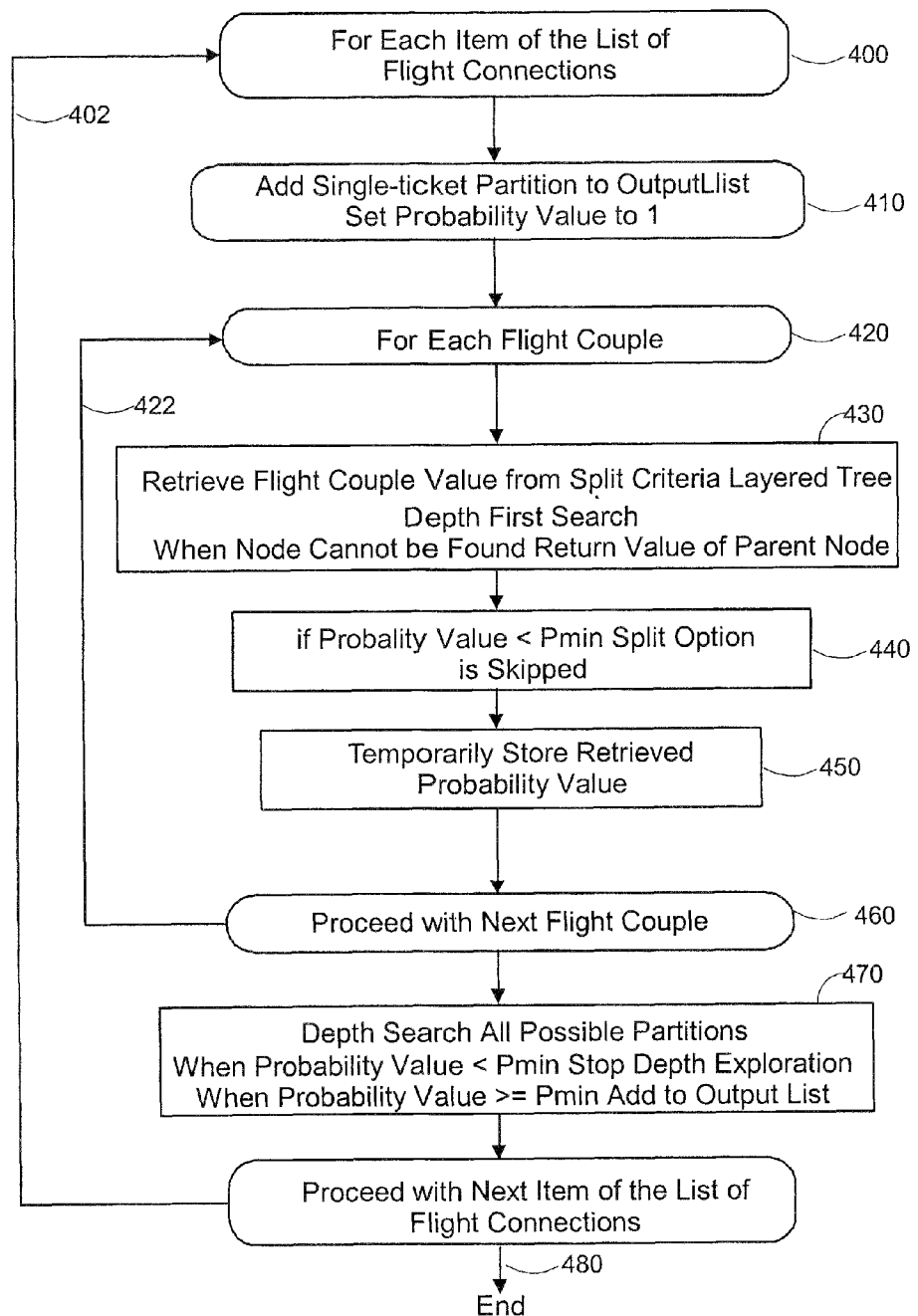
FIG. 4 describes the steps of the method for valuating the partitions.

FIG. 4 describes the steps of the method for valuating the partitions.

The ticket splitter from the tree of split criteria (350) shown in FIG. 3 performs valuation of the partitions for each item (400) of the list of flight connections (202) provided in input by the front-end part of a low fare search application as discussed in FIG. 2. All items of the list are successively gone through (402). A standard flight search engine (201) of the kind shown in FIG. 2, can easily deliver a list of flight connections comprised of several thousand items for a single travel request (up to 75 combinations of connections, schedules, classes, etc., are possibly considered in each direction which, when combined, give 75×75=5625 combinations). Up to several hundreds of thousands of combinations may have to be considered in the worst case.

The purpose of the valuation is to attribute to the recommended partitions a probability value of successfully getting a cheaper split-solution than the single-ticket solution. Hence, the single-ticket partition is always added to the list of recommended partitions as a reference with a probability value of 1 (410). Organized as a tree of split criteria to speed up searches, the partition valuation function is thus able to process a very large number of flight connections. The current flight couple from where a split or partition of the ticket is attempted is used for searching the tree (420). Examples of flight couples appear in the detailed example of FIG. 3. All combinations of flight couples are exhaustively tried (422). Tree depth first search of all possible partitions (430) consists in exploring all possible split positions in such a way that when a flight couple is not split-able, or as soon as probability value is found to be less than the threshold value Pmin (440), the exploration is stopped and next split position is attempted (460). Probability value is temporarily stored (450) to allow evaluating the overall partition probability values.

For example, if four consecutive flights are considered there are three possible flight couples and three split positions successively referenced, e.g.: 1, 2 and 3. Then, the depth first search for partitions explores the split possibilities in the following order: 1, 12, 123, 13, 2, 23, 3. If, e.g., value of split at position 2 is lower than the defined threshold Pmin, split 23 will not be searched and next split position is tried (460) if any is left.

Then, partitions probabilities are valuated from the above retrieved probabilities of flight couples. The partitions that have a probability value larger than or equal to the defined threshold Pmin are added to the output list of recommended partitions (470). Each time found probability value is below threshold the current tree search is ended. Overall valuation process ends when all flight connections have been tried (480). It is worth noting that n split points generate $2^n-1$ partitions.

What is claimed is:

1. A travel search tool comprising:
at least one hardware-based computing resource;
a flight search engine configured to output, from a source of flight scheduling information, a plurality of flight itineraries for traveling from an origin to a destination, each flight itinerary comprising a split ticket with at least one pair of travel tickets having a common connection;
a ticket splitter executed by the at least one hardware-based computing resource and configured to process the flight itineraries, the ticket splitter further configured to calculate, for each flight itinerary, a probability value corresponding to a probability that the flight itinerary has a total cost less than a reference cost of a single non-split travel ticket for reaching the destination from the origin, and to select each flight itinerary for which the probability value is greater than a predetermined reference value as an element of a set of recommended split tickets; and
a low fare engine configured to determine an actual cost for each split ticket of the set of recommended split tickets and to transmit the set of recommended split tickets and the actual costs to a travel service provider.

2. The travel search tool of claim 1 wherein the ticket splitter is further configured to record the flight itineraries received from the flight search engine as a tree, and to store with each node of the tree the probability value.

3. The travel search tool of claim 2 wherein the ticket splitter is further configured to perform a tree depth first search of the flight itineraries stored in the tree, the probability value being evaluated at each node to determine whether to add the split ticket represented by each itinerary to the set of recommended split tickets.

4. The travel search tool of claim 2 wherein the ticket splitter is further configured to periodically update the tree based on traffic of travel transactions processed by the source of flight scheduling information based, at least in part, on actual airline traffic conditions and actual carrier seat availabilities.

5. The travel search tool of claim 2 wherein the ticket splitter is further configured to periodically update the tree based on traffic of travel transactions processed by the source of flight scheduling information based, at least in part, on actual airline traffic conditions.

6. The travel search tool of claim 2 wherein the ticket splitter is further configured to periodically update the tree based on traffic of travel transactions processed by the source of flight scheduling information based, at least in part, on actual carrier seat availabilities.

7. A method, comprising:
   outputting, from a source of flight scheduling information, a plurality of flight itineraries for traveling from an origin to a destination, each flight itinerary comprising a split ticket with at least one pair of travel tickets having a common connection;
   for each flight itinerary, computing, by at least one hardware-based computing resource, a probability value corresponding to a probability that the flight itinerary has a total cost less than a reference cost of a single non-split travel ticket for reaching the destination from the origin;
   selecting each flight itinerary for which the probability value is greater than a predetermined reference value as an element of a set of recommended split tickets;
   determining, by at least one hardware-based computing resource, an actual cost for each split ticket of the set of recommended split tickets; and
   transmitting the set of recommended split tickets and the actual costs to a travel service provider.

8. The method of claim 7 further comprising recording the flight itineraries received from the flight search engine as a tree, and storing with each node of the tree the probability value.

9. The method of claim 8 further comprising performing a tree depth first search of the flight itineraries stored in the tree, the probability value being evaluated at each node to determine whether to add the split ticket represented by each itinerary to the set of recommended split tickets.

10. The method of claim 8 further comprising periodically updating the tree based on traffic of travel transactions processed by the source of flight scheduling information based, at least in part, on actual airline traffic conditions and actual carrier seat availabilities.

11. The method of claim 8 further comprising periodically updating the tree based on traffic of travel transactions processed by the source of flight scheduling information based, at least in part, on actual airline traffic conditions.

12. The method of claim 8 further comprising periodically updating the tree based on traffic of travel transactions processed by the source of flight scheduling information based, at least in part, on actual carrier seat availabilities.

* * * * *